(12) United States Patent
Wang et al.

(10) Patent No.: US 11,533,124 B2
(45) Date of Patent: Dec. 20, 2022

(54) METHOD AND A DEVICE FOR SHARING RESOURCE

(71) Applicant: Telefonaktiebolaget LM Ericsson (publ), Stockholm (SE)

(72) Inventors: Wei Wang, Kanata (CA); Liping Zhang, Beijing (CN); Pu Yao, Beijing (CN); Qingyu Miao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 136 days.

(21) Appl. No.: 16/771,251

(22) PCT Filed: Dec. 22, 2017

(86) PCT No.: PCT/CN2017/117869
§ 371 (c)(1),
(2) Date: Jun. 10, 2020

(87) PCT Pub. No.: WO2019/119386
PCT Pub. Date: Jun. 27, 2019

(65) Prior Publication Data
US 2021/0176002 A1 Jun. 10, 2021

(51) Int. Cl.
*H04L 1/00* (2006.01)
*H04W 4/70* (2018.01)
*H04W 4/80* (2018.01)

(52) U.S. Cl.
CPC .......... *H04L 1/0027* (2013.01); *H04L 1/0003* (2013.01); *H04W 4/70* (2018.02); *H04W 4/80* (2018.02)

(58) Field of Classification Search
CPC ........... H04W 74/004; H04W 74/0833; H04W 74/006; H04W 74/008; H04W 68/02;
(Continued)

(56) References Cited

U.S. PATENT DOCUMENTS

| 2013/0208664 A1 | 8/2013 | Viswanathan |
| 2017/0201393 A1 | 7/2017 | Gaal et al. |

(Continued)

FOREIGN PATENT DOCUMENTS

| EP | 3182634 A1 | 6/2017 |
| GN | 106936556 A | 7/2017 |
| WO | 2017171184 A1 | 10/2017 |

OTHER PUBLICATIONS

PCT International Search Report and Written Opinion, dated Sep. 13, 2018 for International Application PCT/CN2017/117869, 6 pages.

(Continued)

*Primary Examiner* — Iqbal Zaidi
(74) *Attorney, Agent, or Firm* — Sage Patent Group (57) ABSTRACT

A method implemented by a network device in a communication network is provided. The network device is operable to communicate with a User Equipment UE and a Narrow Band Internet Of Things NB-IoT terminal device in the communication network. Said method may comprise configuring NB-IoT Physical Resource Blocks PRBs. Said method may further comprise when scheduling said UE, if said configured NB-IoT PRBs have not been allocated to said NB-IoT terminal device and if available PRBs other than said configured NB-IOT PRBs are not enough for said UE, attempting to allocate said configured NB-IoT PRBs for said UE. A network device performing said method is also provided. Further, a communication network comprising said network device is also provided.

16 Claims, 6 Drawing Sheets

(58) Field of Classification Search
CPC .......... H04W 72/0486; H04W 72/0446; H04L 5/001; H04L 27/2607
See application file for complete search history.

(56) References Cited

U.S. PATENT DOCUMENTS

| | | | |
|---|---|---|---|
| 2017/0289965 A1 | 10/2017 | You et al. | |
| 2019/0191363 A1* | 6/2019 | Ahmet | H04L 67/12 |
| 2019/0372696 A1* | 12/2019 | Park | H04J 11/00 |
| 2021/0274568 A1* | 9/2021 | Sengupta | H04L 5/0051 |

OTHER PUBLICATIONS

Extended European Search Report for European Patent Application No. 17935520.1 dated Jul. 12, 2021, 10 pages.
Sony, 3GPP TSG RAN NR AH3, R1-1716252, "NR Coexistence with eMTC", Nagoya, Japan, Sep. 18-21, 2017, XP051339709, 5 pages.
Sony, 3GPP TSG-RAN WG1 Meeting #79, R1-145019, "MTC Operation Using ePDCCH", San Francisco, USA, Nov. 17-21, 2014, XP050876065, 17 pages.
Ericsson, 3GPP TSG-RAN WG1 #83, R1-157419, "NB-IoT—DL Design", Anaheim, California, USA, Nov. 15-22, 2015, XP051042206, 11 pages.

* cited by examiner

METHOD AND A DEVICE FOR SHARING RESOURCE

CROSS-REFERENCE TO RELATED APPLICATIONS

This application is a 35 U.S.C. § 371 national stage application for International Application No. PCT/CN2017/117869, entitled "A METHOD AND A DEVICE FOR SHARING RESOURCE", filed on Dec. 22, 2017, the disclosures and contents of which are hereby incorporated by reference in their entireties.

TECHNICAL FIELD

The present disclosure generally relates to communication networks, and more specifically to a method and a device for sharing resource between a UE and a NB-IoT terminal device.

BACKGROUND

This section introduces aspects that may facilitate better understanding of the disclosure. Accordingly, the statements of this section are to be read in this light and are not to be understood as admissions about what is in the prior art or what is not in the prior art.

Wireless communication networks are widely deployed to provide various communication services such as voice, video, packet data, messaging, broadcast, etc. These wireless networks may be multiple-access networks capable of supporting multiple Users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks and Single-Carrier FDMA (SC-FDMA) networks.

A wireless communication network may include a number of base stations that can support communication for a number of terminal devices. A terminal device may communicate with a base station via the downlink and uplink. The downlink (or forward link) refers to the communication link from the base station to the terminal device, and the uplink (or reverse link) refers to the communication link from the terminal device to the base station.

Figure 1:
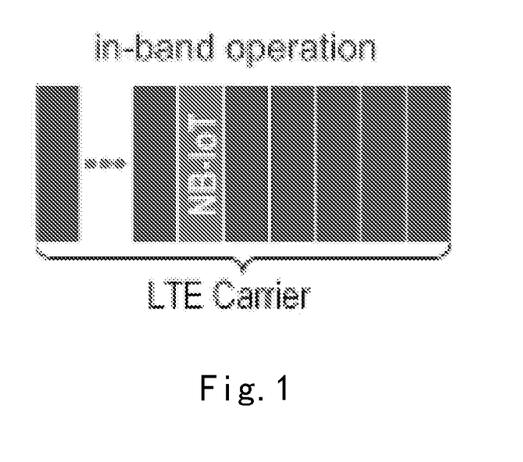
FIG. 1 is a schematic diagram illustrating in-band operation mode of NB-IoT deployment.

With the development of technology, the Third Generation Partnership Project (3GPP) introduced a narrowband Internet-Of-Things (NB-IoT) design into its Release 13 specifications of the Long-Term Evolution (LTE) wireless mobile communications standard. NB-IoT improves indoor coverage, supports for massive number of low throughput devices, low delay sensitivity, ultra low device cast, low device power consumption. NB-IoT terminal device can be deployed in three different modes of operation: stand-alone operation, guardband operation and in-band operation. For in-band deployment, NB-IoT cell will occupy a frequency band of 180 KHz within host cell, which corresponds to one physical resource block (PRB) in a transmission following the current 3GPP regulation such as WCDMA or LTE as shown in FIG. 1. For simplicity, we call this PRB as "NB-IoT PRB" in following description.

For NB-IoT, downlink Narrowband Reference Signal (NRS) is carried in NB-IoT PRB for measurement purposes, such as Radio link monitoring, uplink power control, mobility in RRC_IDLE state and so on.

It is specified in 3GPP Release 14 that NRSs will be carried in at least one downlink sub-frame per radio frame. However, NRS is unknown to those UEs following the current 3GPP regulation such as WCDMA or LTE as no such signals in specification. Thus, if a NB-IoT PRB is allocated to a UE when it's not used by a NB-IoT terminal device, the NRS is interference to the UE.

In the current solution of in-band NB-IoT deployment, one PRB is always reserved to NB-IoT terminal device when a NB-IoT cell is enabled. When there is no NB-IoT traffic, the reserved PRB will be wasted.

Moreover, if resource allocation type 0 is used in host LTE cell, the host LTE downlink scheduler is only capable of scheduling Users with a resolution of the Resource Block Group (RBG) size, so the capacity consumed from the host LTE cell for the NB-IoT cell is a whole RBG instead of one PRB.

The capacity consumed from the host LTE cell for the NB-IoT cell is larger than 1 PRB and can be the following:
 20 MHz: 4% (4/100) instead if 1% (1/100)
 10 MHz: 6% (3/50) instead of 2% (1/50)
 5 MHz: 8% (2/25) instead of 4% (1/25)

If the host LTE cell deploys with more than one in-band NB-IoT cells, the situation will become even worse. The capacity consumed from the host LTE cell for the NB-IoT cells will enlarged greatly.

SUMMARY

It is an object of the present disclosure to achieve resource sharing between a UE and a NB-IoT terminal device and avoid interference introduced by NRSs to said UE.

According to a first aspect of the present disclosure, a method implemented by a network device in a communication network is provided. The network device is operable to communicate with a UE and a NB-IoT terminal device in the communication network. Said method may comprise configuring NB-IoT Physical Resource Blocks PRBs. Said method may further comprise when scheduling said UE, if said configured NB-IoT PRBs have not been allocated to said NB-IoT terminal device and if available PRBs other than said configured NB-IOT PRBs are not enough for said UE, attempting to allocate said configured NB-IoT PRBs for said UE.

In an alternative embodiment of the first aspect, said attempting to allocate said configured NB-IoT PRBs for said UE may comprise scheduling said UE including said configured NB-IoT PRBs; and if a modulation and coding scheme MCS scheduled by said network device for said UE is greater than a first threshold or if a number of PRBs allocated for said UE is smaller than a second threshold, rescheduling said UE by removing said configured NB-IoT PRBs from the allocated PRBs; or if said MCS scheduled by said network device for said UE is smaller than said first threshold and if said number of PRBs allocated for said UE is greater than said second threshold, keeping using said configured NB-IoT PRBs for said UE.

In a further alternative embodiment of the first aspect, said attempting to allocate said configured NB-IoT PRBs for said UE may comprise scheduling said UE including said configured NB-IoT PRBs; and if a MCS scheduled by said network device for said UE is smaller than a third threshold and if a number of PRBs allocated for said UE is greater than a fourth threshold, carrying Narrow Band Reference Signals NRSs in said configured NB-IoT PRBs; or if said MCS scheduled by said network device for said UE is greater than said third threshold or if said number of PRBs allocated for said UE is smaller than said fourth threshold, muting said NRSs in said configured NB-IoT PRBs. In said first aspect of the present disclosure, after muting said NRSs in said configured NB-IoT PRBs, said method may further comprises starting a timer to count a first duration; when said timer expires, carrying said NRSs in said configured NB-IoT PRBs for a second duration; and resetting said timer.

According to a second aspect of the present disclosure, a method implemented by a network device in a communication network is provided. The network device is operable to communicate with a User Equipment UE and a Narrow Band Internet Of Things NB-IoT terminal device in the communication network. Said method may comprise configuring NB-IoT Physical Resource Blocks PRBs. Said method may further comprise scheduling said UE including said configured NB-IoT PRBs and if said MCS scheduled by said network device for said UE is smaller than said first threshold and if said number of PRBs allocated for said UE is greater than said second threshold, keeping using said configured NB-IoT PRBs for said UE. In said method, said keeping using said configured NB-IoT PRBs for said UE may comprise if said MCS scheduled by said network device for said UE is smaller than a third threshold and if a number of PRBs allocated for said UE is greater than a fourth threshold, carrying Narrow Band Reference Signals NRSs in said configured NB-IoT PRBs; or if said MCS scheduled by said network device for said UE is greater than said third threshold or if said number of PRBs allocated for said UE is smaller than said fourth threshold, muting said NRSs in said configured NB-IoT PRBs. In said second aspect of the present disclosure, said first threshold is greater than said third threshold and said second threshold is greater than said fourth threshold. In said second aspect of the present disclosure, after muting said NRSs in said configured NB-IoT PRBs, said method may further comprises starting a timer to count a first duration; when said timer expires, carrying said NRSs in said configured NB-IoT PRBs for a second duration; and resetting said timer.

According to a third aspect of the present disclosure, a network device in a communication network is provided. The network device is operable to communicate with a User Equipment UE and a Narrow Band Internet Of Things NB-IoT terminal device in the communication network. Said network device may comprise a processor; and a memory communicatively coupled to the processor and adapted to store instructions which, when to executed by the processor, cause the network device to perform a method according to said first aspect of the present disclosure and said second aspect of the present disclosure.

According to a fourth aspect of the present disclosure, a communication network is provided. Said communication network may comprise: a User Equipment UE; a Narrow Band Internet Of Things NB-IoT terminal device; and a network device operable to communicate with said UE and said NB-IoT terminal device. Said network device may comprise a processor and a memory communicatively coupled to the processor and adapted to store instructions which, when executed by the processor, cause the network device to perform a method according to said first aspect of the present disclosure and said second aspect of the present disclosure.

According to a fifth aspect of the present disclosure, a non-transitory machine-readable medium having a computer program stored thereon is provided. When said computer program is executed by a set of one or more processors of a network device, the one or more processors are caused to perform a method according to said first aspect of the present disclosure and said second aspect of the present disclosure.

On one hand, in the present disclosure, since configured NB-IoT PRBs as well as other PRBs in a same RBG will be conditionally allocated to a UE, resource waste can be reduced and resource utilization can be improved. When NB-IoT PRBs are determined being allocated to a UE, NRSs will be conditionally muted to decrease the impact on host cell of said UE, the host LTE downlink cell throughput can be improved in case that in-band NB-IoT cell exists, thus it is beneficial from UE's performance perspective. Further, in the present disclosure, since when said configured NB-IoT PRBs are allocated to a UE and NRSs are muted in these PRBs, a timer is introduced to resume transmission of NRSs, it is beneficial from NB-IoT terminal device's performance perspective.

BRIEF DESCRIPTION OF THE DRAWINGS

The present disclosure may be best understood by way of example with reference to the following description and accompanying drawings that are used to illustrate embodiments of the present disclosure. In the drawings, like reference numerals or letters are used to designate like or equivalent elements. The drawings are illustrated for facilitating better understanding of the embodiments of the disclosure and not necessarily drawn to scale, in which.

DETAILED DESCRIPTION

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

In the following detailed description, numerous specific details such as logic implementations, types and interrelationships of system components, etc. are set forth in order to provide a more thorough understanding of the present disclosure. It should be appreciated, however, by one skilled in the art that the present disclosure may be practiced without such specific details. In other instances, control structures, circuits and instruction sequences have not been shown in detail in order not to obscure the present disclosure. Those of ordinary skill in the art, with the included descriptions, will be able to implement appropriate functionality without undue experimentation.

References in the specification to "one embodiment", "an embodiment", "an example embodiment" etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future.

The term "device" refers to a network device or a terminal device or user equipment in a wireless communication network.

The term "network device" refers to a device in a wireless communication network via which a terminal device accesses the network and receives services therefrom. The network device refers a base station (BS), an access point (AP), a Mobile Management Entity (MME), Multi-cell/Multicast Coordination Entity (MCE), a gateway, a server, a controller or any other suitable device in the wireless communication network. The BS may be, for example, a node B (NodeB or NB), an evolved NodeB (eNodeB or eNB), a gNB, a Remote Radio Unit (RRU), a radio header (RH), a remote radio head (RRH), a relay, a low power node such as a femto, a pico, and so forth.

Yet further examples of network device include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, terminal device, or other suitable device. The terminal device may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like. Under most circumstances the terms "terminal device" and "user equipment" are often used interchangeably.

The terminal device may support device-to-device (D2D) communication, for example by implementing a 3GPP standard for sidelink communication, and may in this case be referred to as a D2D communication device.

As yet another specific example, in an Internet of Things (IoT) scenario, a terminal device may represent a machine or other device that performs monitoring and/or measurements, and transmits the results of such monitoring and/or measurements to another terminal device and/or a network equipment. The terminal device may in this case be a machine-to-machine (M2M) device, which may in a 3GPP context be referred to as a machine-type communication (MTC) device. As one particular example, the terminal device may implement 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment that is capable of monitoring and/or reporting on its operational status or other functions associated with its operation.

As used herein, the singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on".

Now some exemplary embodiments of the present disclosure will be described below with reference to the figures. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on, that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of or one or more physical network interfaces to establish network connections (to transmit and/or receive code and/or data using propagating signals) with other electronic devices. One or more parts of an embodiment of the present disclosure may be implemented using different combinations of software, firmware, and/or hardware.

For sake of clarity, certain aspects of the techniques are described below for LTE, and LTE terminology is used in much of the description blow. However, the present disclosure is not limited to LTE.

In the present disclosure, dynamic resource sharing between LTE and NB-IoT cell is proposed to utilize the resource in an efficient manner. The PRBs will be consumed by NB-IoT terminal device only in case they are scheduled to NB-IoT terminal device, instead of at NB-IoT cell unlock that the PRBs are configured to NB-IoT. When there is no traffic for NB-IoT cell, the PRB(s) can be used by host LTE cell as shown in FIG. 2b.

Figures 2A, 2B:
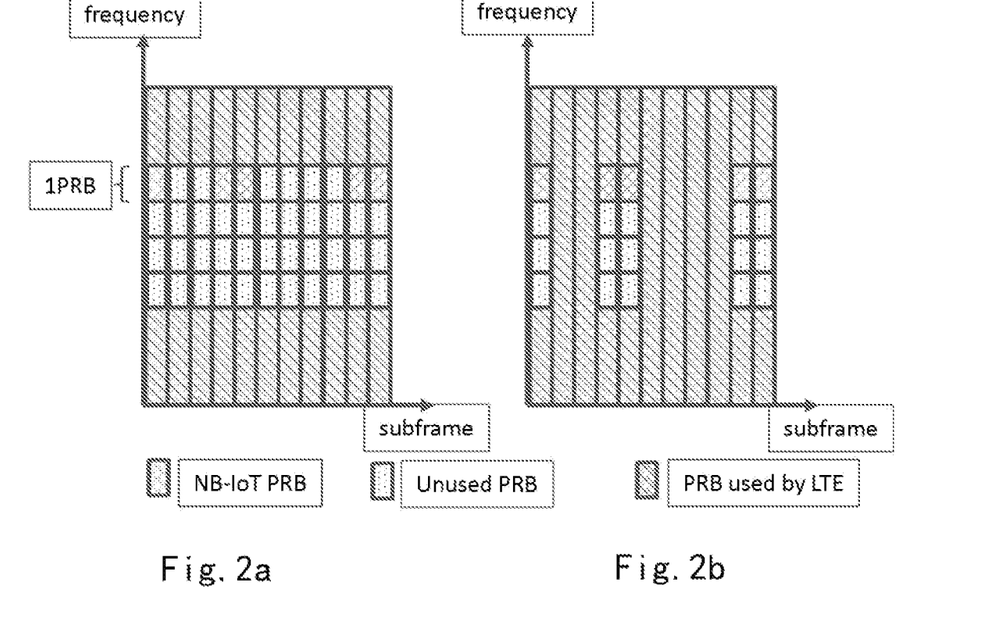
FIG. 2a is a schematic diagram illustrating downlink PRB resource allocation between a UE and a NB-IoT terminal device according to the prior art.
FIG. 2b is a schematic diagram illustrating downlink PRB resource allocation between said UE and said NB-IoT terminal device according to an embodiment of the present disclosure.

For sake of comparison between prior art and the present disclosure, FIG. 2a and FIG. 2b are shown respectively. FIG. 2a is a schematic diagram illustrating downlink PRB resource allocation between a UE and a NB-IoT terminal device according to the prior art and FIG. 2b is a schematic diagram illustrating downlink PRB resource allocation between a UE and NB-IoT terminal device according to the present disclosure. In FIG. 2a and FIG. 2b, we take 20 MHz LTE bandwidth as example. From FIG. 2a, it can be seen that although only one PRB is used by NB-IoT terminal device, 4 PRBs as a RBG are seen as consumed in total from LTE host cell. Furthermore, even if there is no traffic to NB-IoT terminal device, the PRBs are always reserved and thus wasted. From FIG. 2b, if dynamic resource sharing is used, the PRBs can be dynamically shared between said NB-IoT terminal device and said UE. When there is no traffic in NB-IoT cell, then the PRBs can be used by LTE cell. For simplicity, UE applying for current 3GPP LTE regulation is abbreviated as LTE UE or UE in the following description to differentiate NB-IoT terminal device.

Figure 3:
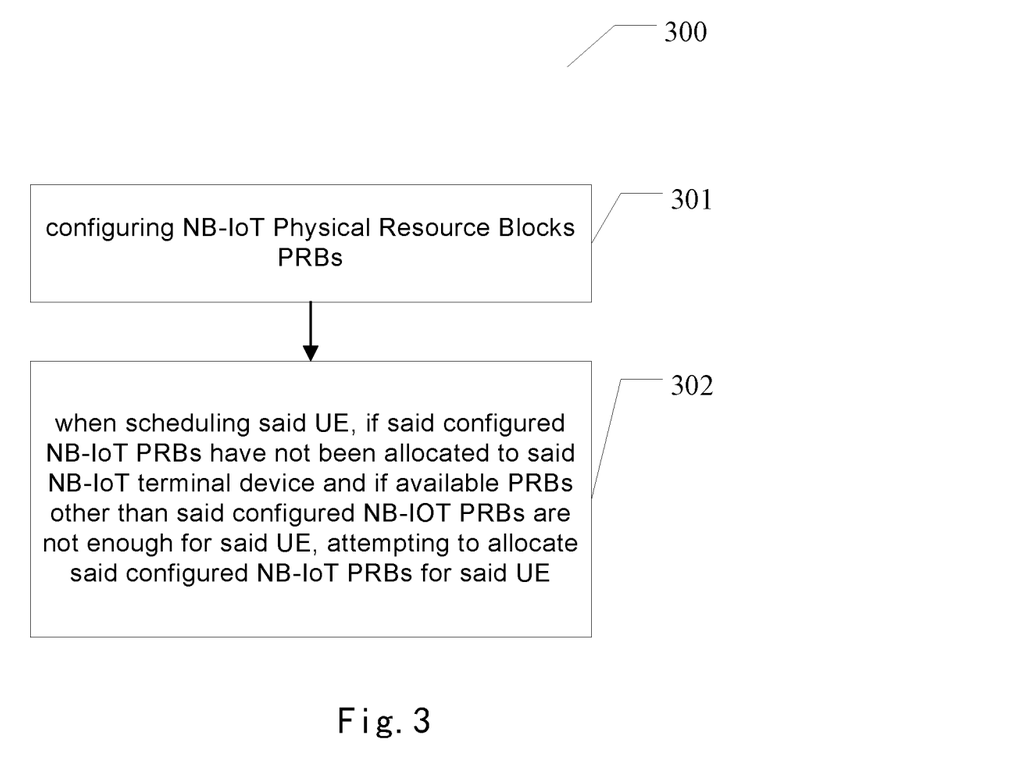
FIG. 3 is a flow chart illustrating a method implemented on a network device according to some embodiments of the present disclosure.

According to an embodiment of the present disclosure, NB-IoT PRB will be set with lowest priority when eNB performs scheduling for LTE UE. In other words, if there is not enough PRBs except NB-IoT PRB that can be allocated to the LTE UE, then it will be considered in the scheduling. FIG. 3 shows such an embodiment.

FIG. 3 is a flow chart illustrating a method 300 implemented on a network device according to some embodiments of the present disclosure. For simplicity and clarity, the network device may be a base station communicating with LTE UEs and NB-IoT terminal devices by way of example, but it is not limited to the base station. The operations in this and other flow charts will be described with reference to the exemplary embodiments of the other figures. However, it should be appreciated that the operations of the flow charts may be performed by embodiments of the present disclosure other than those discussed with reference to the other figures, and the embodiments of the present disclosure discussed with reference to these other figures may perform operations different than those discussed with reference to the flow charts.

In one embodiment, the method begins with block 301. At block 301, the network device configures NB-IoT PRBs, for example, when an in-band NB-IoT cell is enabled. Thus the frequency and time location of the resource blocks are determined. However, till the NB-IoT PRBs are scheduled by the network device for NB-IoT terminal device, the NB-IoT terminal device can use the configured NB-IoT PRBs. When scheduling said LTE UE, if said configured NB-IoT PRBs have not been allocated to said NB-IoT terminal device, and if available PRBs other than said configured NB-IoT PRBs are not enough, the network device then attempts to allocate said configured NB-IoT PRBs for said LTE UE at block 302. That is, said configured NB-IoT PRBs will be used with lowest priority when scheduling said UE. Compared with prior art, this can achieve dynamic resource sharing between LTE cell and NB-IoT cell in more efficient manner.

Figure 4:
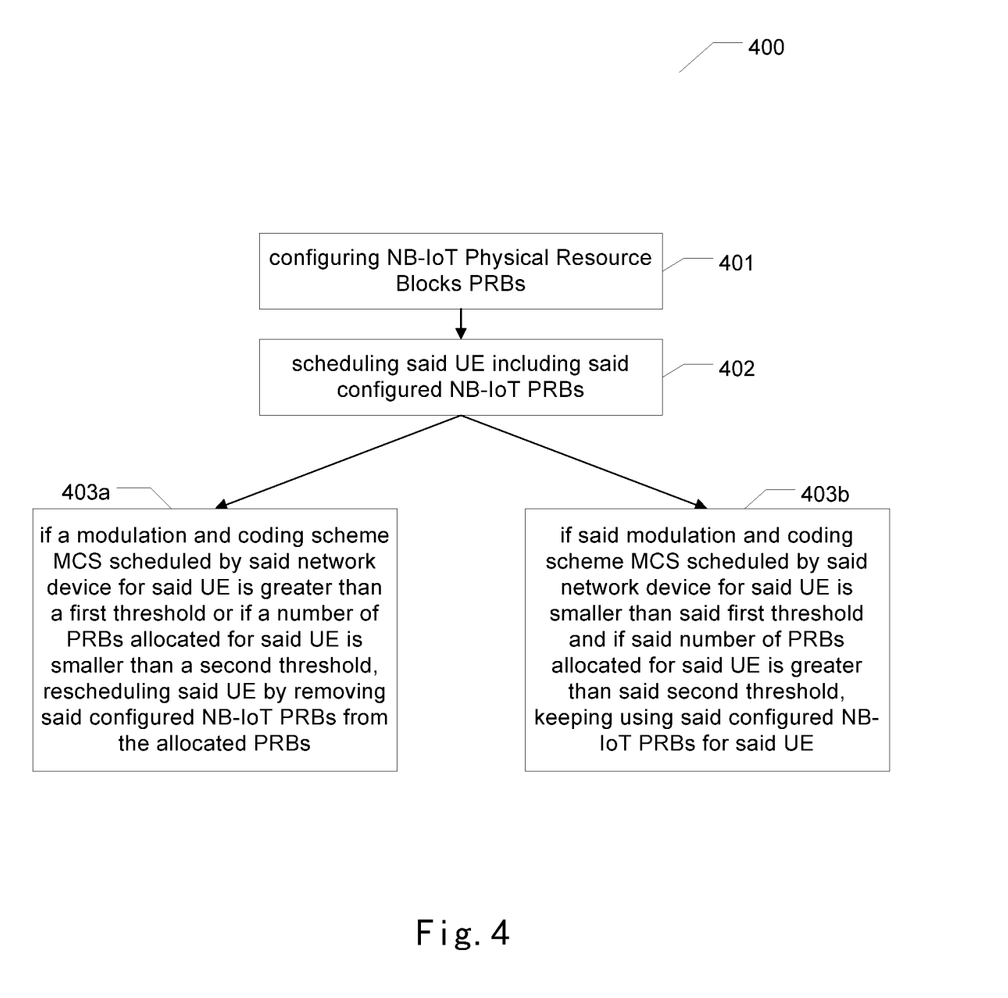
FIG. 4 is a flow chart illustrating a method implemented on a network device according to some embodiments of the present disclosure.

FIG. 4 is a flow chart illustrating a method 400 implemented on a network device according to some embodiments of the present disclosure. Said method 400 begins with block 401. At block 401, the network device configures NB-IoT PRBs. Then, if said configured NB-IoT PRBs have not been allocated to said NB-IoT terminal device and if available PRBs other than said configured NB-IoT PRBs are not enough, the network device attempts to allocate the configured NB-IoT PRBs for the LTE UE by first temporarily scheduling the LTE UE with resources including said configured NB-IoT PRBs at block 402.

Then, if a modulation and coding scheme MCS scheduled by said network device for said UE is greater than a first threshold or if a number of PRBs allocated for said UE is smaller than a second threshold, at block 403a, the network device reschedules said LTE UE by removing said configured NB-IoT PRBs from the allocated PRBs. If said MCS scheduled by said network device for said LTE UE is smaller than said first threshold and if said number of PRBs allocated for said LTE UE is greater than said second threshold, at block 403b, the network device keeps using said configured NB-IoT PRBs for said LTE UE. Hereby, the number of PRBs allocated for said LTE UE includes a number of allocated NB-IoT PRBs.

For the embodiment involved in FIG. 4, since before said configured NB-IoT PRBs are eventually allocated to a LTE UE, condition(s) will be checked if it's appropriate to keep the temporary schedule of the configured NB-IoT PRBs to the LTE UE, it is beneficial from NB-IoT performance perspective.

As NRSs will be by default continuously carried in the NB-IoT PRBs in every sub-frame in case of in-band deployment when the NB-IoT PRBs are configured, if host LTE cell allocates the configured PRB(s) during LTE UE scheduling, the NRSs carried by the configured PRB(s) may have negative impact on the LTE downlink decoding performance due to it is unknown to the LTE UE, and the LTE UE receives the NRSs as its data while cannot decode it.

In order to avoid the NRSs impact on decoding performance of LTE UE, in a preferred embodiment, NRSs transmission will be conditionally muted to decrease the impact on host LTE cell.

In an embodiment, when NB-IoT PRBs are allocated to said LTE UE, NRSs will be conditionally muted to decrease the impact on host LTE cell. We should consider the scheduled MCS condition for LTE UE. If the NB-IoT PRBs are used by LTE UE, with larger scheduled MCS, NRS impact is worse. Thus, if the scheduled MCS is larger than a threshold, which could be determined by simulation, then NRS should be muted, otherwise, NRS can be carried. If NRSs are carried, the data Resource Element (RE) for LTE UE originally will be punctured and occupied by NRS. However, the other PRBs belong to a same RBG can still be used for the LTE UE. Thus the resource efficiency is improved. We may also consider the number of allocated PRBs for LTE UE. If LTE UE is scheduled with large number of PRBs where including NB-IoT PRB, the impact of NRS will be less. However, if LTE UE is scheduled with limited number of PRBs which also contains NB-IoT PRB, the NRSs impact on LTE UE are much more. Thus, if the number of assigned PRBs including NB-IoT PRBs is larger than a threshold, then NRSs could be carried; otherwise, it should be muted. The above two instanced conditions can be separately considered or combined in following way. When NB-IoT PRBs are eventually allocated to a LTE UE, if MCS is larger than a threshold, or the number of allocated PRBs is smaller than a threshold, then NRSs should be muted; if MCS is smaller than a threshold meanwhile the number of allocated PRBs is larger than a threshold, then NRSs should be carried. Such embodiment can be reflected in FIG. 5.

Figure 5:
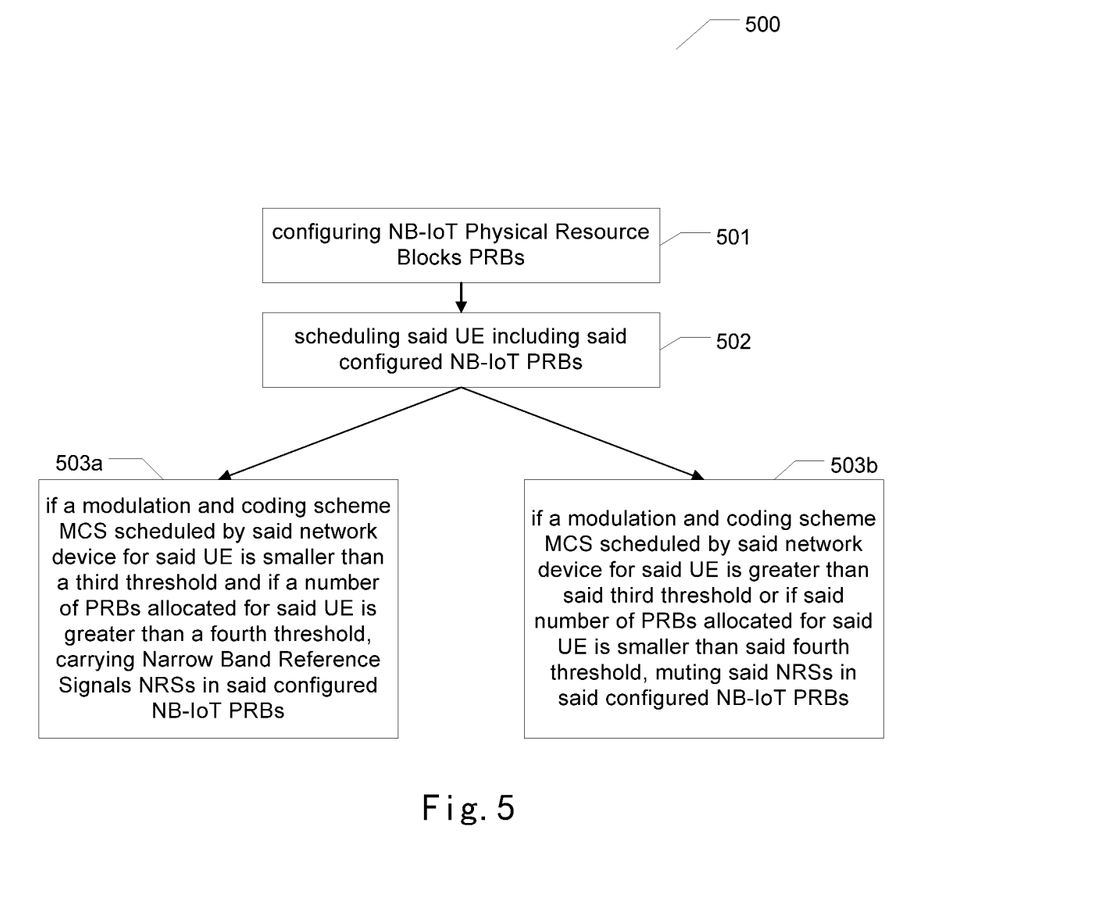
FIG. 5 is a flow chart illustrating a method implemented on a network device according to some embodiments of the present disclosure.

FIG. 5 is a flow chart illustrating a method 500 implemented on a network device according to some embodiments of the present disclosure. Said method 500 begins with block 501. At block 501, the network device configures NB-IoT PRBs. The purpose of configuring NB-IoT PRBs is a premise of allocating NB-IoT PRBs for said NB-IoT terminal device when scheduling the NB-IoT terminal device. Then, when scheduling a LTE UE, if said configured NB-IoT PRBs have not been allocated to said NB-IoT terminal device and if available PRBs other than said configured NB-IOT PRBs are not enough for said LTE UE, the network device attempts to allocate the configured NB-IoT PRBs for the LTE UE by first temporarily scheduling the LTE UE including said configured NB-IoT PRBs at block 502.

Then, if a MCS scheduled by said network device for said LTE UE is smaller than a third threshold and if a number of PRBs allocated for said LTE UE is greater than a fourth threshold, the attempting to allocate the configured NB-IoT PRBs for the LTE UE further includes block 503a, where NRSs are carried in said configured NB-IoT PRBs. Alternatively, if a MCS scheduled by said network device for said LTE UE is greater than said third threshold or if said number of PRBs allocated for said LTE UE is smaller than said fourth threshold, the attempting to allocate the configured NB-IoT PRBs for the LTE UE further includes block 503b, where NRSs are muted in said configured NB-IoT PRBs. Hereby, the number of PRBs allocated for said LTE UE includes a number of allocated NB-IOT PRBs.

For the embodiment involved in FIG. 5, since when NB-IoT PRBs are allocated to a LTE UE, NRS will be conditionally muted to decrease the impact on host LTE cell, it is beneficial from LTE cell performance perspective, with considering less impact on NB-IoT operation.

Figure 6:
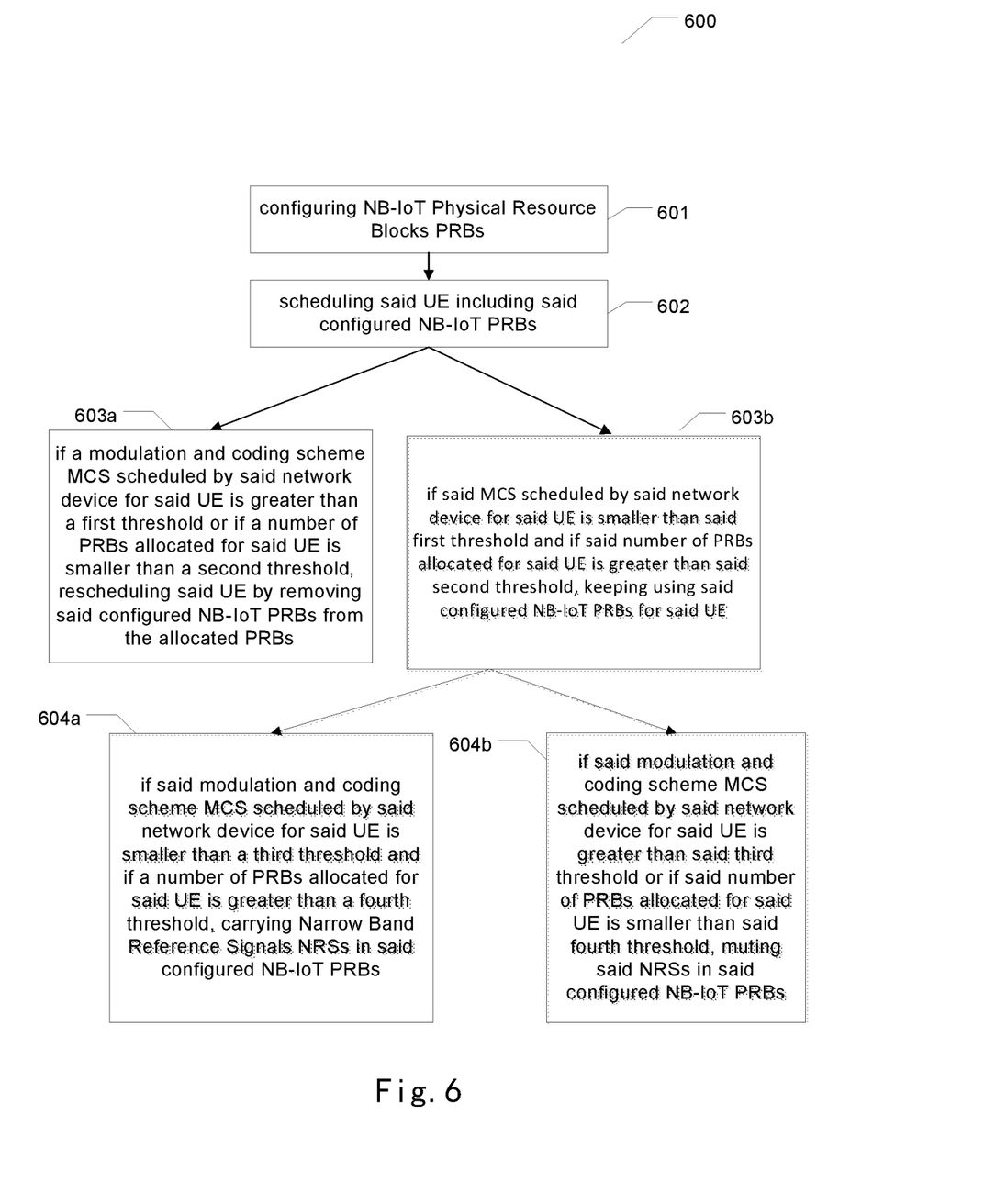
FIG. 6 is a flow chart illustrating a method implemented on a network device according to some embodiments of the present disclosure.

FIG. 6 is a flow chart illustrating a method 600 implemented on a network device according to some embodiments of the present disclosure. Said method 600 begins with block 601. At block 601, the network device configures NB-IoT PRBs. The purpose of configuring NB-IoT PRBs is a premise of allocating NB-IoT PRBs for a NB-IoT terminal device when scheduling the NB-IoT terminal device. When scheduling a LTE UE, if said configured NB-IoT PRBs have not been allocated to said NB-IoT terminal device and if available PRBs other than said configured NB-IOT PRBs are not enough for said LTE UE, the network device attempts to allocate the configured NB-IoT PRBs for the LTE UE by first temporarily scheduling said LTE UE with resources including said configured NB-IoT PRBs, at block 602.

Then, if a modulation and coding scheme MCS scheduled by said network device for said LTE UE is greater than a first threshold or if a number of PRBs allocated for said LTE UE is smaller than a second threshold, the network device reschedules said LTE UE by removing said configured NB-IoT PRBs from the allocated PRBs at block 603a.

Alternatively, if said MCS scheduled by said network device for said LTE UE is smaller than said first threshold, and if said number of PRBs allocated for said LTE UE is greater than said second threshold, the network device keeps said configured NB-IoT PRBs for said LTE UE at block 603b, which means the configured NB-IoT PRBs have eventually allocated to the LTE UE. After block 603b, it would be decided whether NRSs are going to be muted or kept in those allocated NB-IoT PRBs.

If said MCS scheduled by said network device for said LTE UE is smaller than a third threshold and if a number of PRBs allocated for said LTE UE is greater than a fourth threshold, said block 603b of keeping said configured NB-IoT PRBs for said LTE UE can also comprises block 604a where NRSs are carried in said configured NB-IoT PRBs. If said MCS scheduled by said network device for said LTE UE is greater than said third threshold or if said number of PRBs allocated for said LTE UE is smaller than said fourth threshold, said block 603b of keeping said configured NB-IoT PRBs for said LTE UE can also comprises block 604b where said NRSs are muted in said configured NB-IoT PRBs.

For the embodiment involved in FIG. 6, when configured NB-IoT PRBs are eventually allocated to said LTE UE, NRSs will be conditionally muted to decrease the impact on host LTE cell, it is beneficial from LTE UE performance perspective and keeps a balance between LTE cell and NB-IoT cell. If possible interference to LTE UE is not high, NRS would be unnecessary to mute, and then NB-IoT terminal device will receive NRSs in the configured NB-IoT PRBs for measurement, which would be less influence to NB-IoT cell.

In the above embodiments, the first threshold, the second threshold, the third threshold and the fourth threshold can be determined by some simulation technology. In a preferred embodiment, said first threshold is greater than said third threshold and said second threshold is greater than said fourth threshold.

As NRSs are be used by NB-IoT terminal device for many measurement purposes, when NRSs are muted to lower interference to LTE UE, no NRSs transmission will be received by NB-IoT terminal device, which should not be maintained permanently. In order to minimize the impact on NB-IoT terminal device as much as possible, in a preferred embodiment, a timer is introduced. More particularly, said timer will be started to count a first duration since NRSs are muted. When the timer is expired, the NRSs will be transmitted again for a second duration. Then the timer is reset which makes it possible to mute NRS again. During this second duration, said LTE UE cannot be scheduled with NB-IoT PRBs even if they are not used by said NB-IoT terminal device. Alternatively, even when the LTE UE are scheduled with the configured NB-IoT PRBs, NRSs will not mute and NB-IoT terminal device can received the NRSs in the NB-IoT PRBs for measurement. In this preferred embodiment, impact on said NB-IoT terminal device will be minimized.

Figure 7:
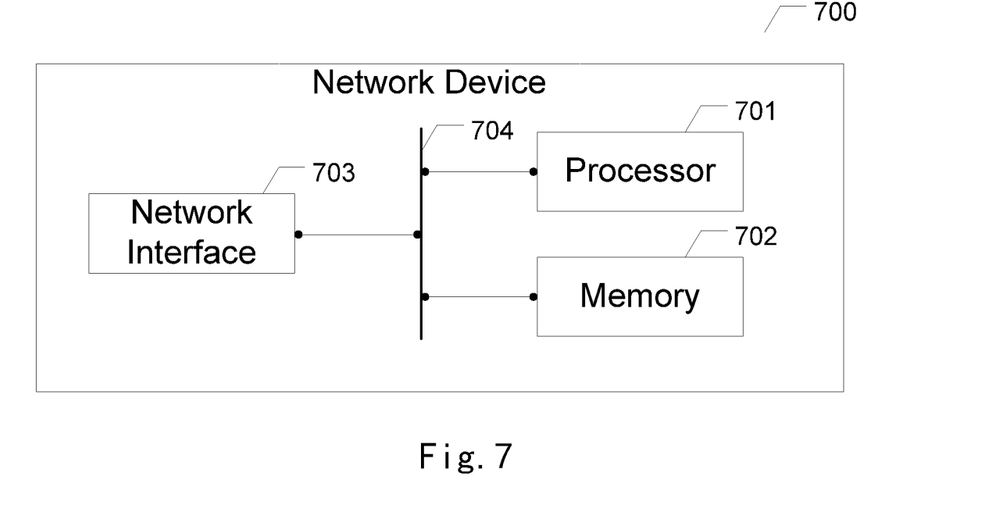
FIG. 7 is a block diagram illustrating a network device according to some embodiments of the present disclosure.

FIG. 7 is a block diagram illustrating a network device 700 according to some embodiments of the present disclosure. As an example, the network device 700 may be a base station communicating with LTE UEs and NB-IoT terminal devices, but it is not limited to the base station. It should be appreciated that the network device 700 may be implemented using components other than those illustrated in FIG. 7.

With reference to FIG. 7, the network device 700 may comprise at least a processor 701, a memory 702, a network interface 703 and a communication medium 704. The processor 701, the memory 702 and the network interface 703 are communicatively coupled to each other via the communication medium 704.

The processor 701 includes one or more processing units. A processing unit may be a physical device or article of manufacture comprising one or more integrated circuits that read data and instructions from computer readable media, such as the memory 702, and selectively execute the instructions. In various embodiments, the processor 701 is implemented in various ways. As an example, the processor 701 may be implemented as one or more processing cores. As another example, the processor 701 may comprise one or more separate microprocessors. In yet another example, the processor 701 may comprise an application-specific integrated circuit (ASIC) that provides specific functionality. In yet another example, the processor 701 provides specific functionality by using an ASIC and by executing computer-executable instructions.

The memory 702 includes one or more computer-usable or computer-readable storage medium capable of storing data and/or computer-executable instructions. It should be appreciated that the storage medium is preferably a non-transitory storage medium.

The network interface 703 may be a device or article of manufacture that enables the network device 700 to communicate with User Equipments and other terminal devices. In different embodiments, the network interface 703 is implemented in different ways. As an example, the network interface 703 may be implemented as an Ethernet interface, a token-ring network interface, a fiber optic network interface, a wireless network interface, or another type of network interface.

The communication medium 704 facilitates communication among the processor 701, the memory 702 and the network interface 703. The communication medium 704 may be implemented in various ways. For example, the communication medium 704 may comprise a Peripheral Component Interconnect (PCI) bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing System Interface (SCSI) interface, or another type of communications medium.

In the example of FIG. 7, the instructions stored in the memory 702 may include those that, when executed by the processor 701, cause the network device 700 to implement the methods described with respect to FIGS. 3 to 6. For sake of clarity, the methods implemented by a network device 700 are not repeated.

For the network device involved in FIG. 7, since configured NB-IoT PRBs as well as other PRBs in a same RBG will be conditionally allocated to a LTE UE, resource waste can be reduced and resource utilization can be improved. When NB-IoT PRBs are determined being allocated to a LTE UE, NRSs will be conditionally muted to decrease the impact on host cell of said LTE UE, the host LTE downlink cell throughput can be improved in case that in-band NB-IoT cell exists, thus it is beneficial from LTE UE's performance perspective. Further, in the present disclosure, since when said configured NB-IoT PRBs are allocated to a LTE UE and NRSs are muted in these PRBs, a timer is introduced to resume transmission of NRSs, it is beneficial from NB-IoT terminal device's performance perspective.

Figure 8:
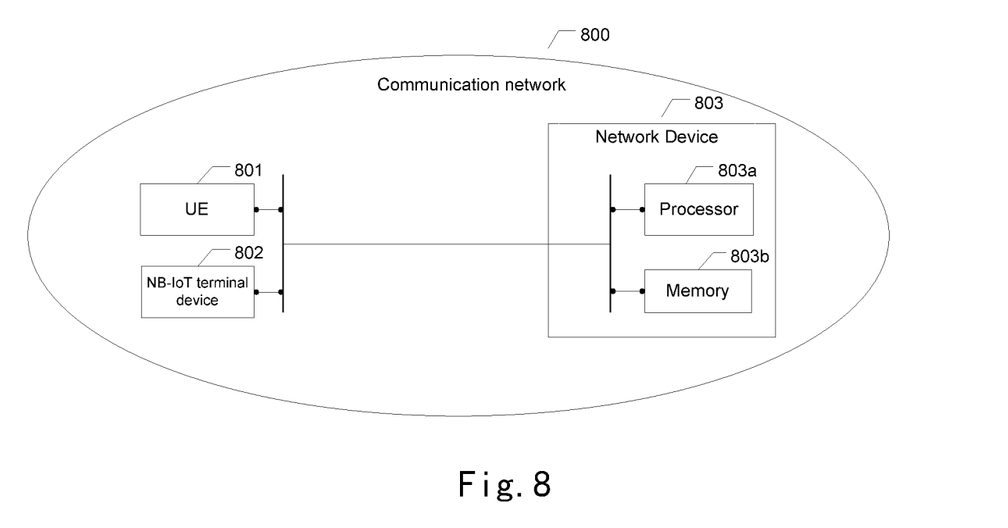
FIG. 8 is a block diagram illustrating a communication network according to some embodiments of the present disclosure.

FIG. 8 is a block diagram illustrating a communication network 800 according to some embodiments of the present disclosure. The wireless communication network 800 comprises at least a LTE UE 801, a NB-IoT terminal device 802 and a network device 803. In one embodiment, the network device 803 may act as the network device as depicted in FIG. 7 and comprise a processor 803a and a memory 803b which are corresponding to the processor 701 and the memory 702 respectively.

In the example of FIG. 8, the instructions stored in the memory 803b may include those that, when executed by the processor 803a, cause the network device 803 to implement the methods described with respect to FIGS. 3 to 6. For sake of clarity, the methods implemented by a network device 803 are not repeated.

For the communication network involved in FIG. 8, since configured NB-IoT PRBs as well as other PRBs in a same RBG will be conditionally allocated to a LTE UE, resource waste can be reduced and resource utilization can be improved. When NB-IoT PRBs are determined being allocated to a LTE UE, NRSs will be conditionally muted to decrease the impact on host cell of said LTE UE, the host LTE downlink cell throughput can be improved in case that in-band NB-IoT cell exists, thus it is beneficial from LTE UE's performance perspective. Further, in the present disclosure, since when said configured NB-IoT PRBs are allocated to a LTE UE and NRSs are muted in these PRBs, a timer is introduced to resume transmission of NRSs, it is beneficial from NB-IoT terminal device's performance perspective.

Throughout the description, embodiments of the present disclosure have been presented through flow diagrams. It will be appreciated that the order of transactions and transactions described in these flow diagrams are only intended for illustrative purposes and not intended as a limitation of the present disclosure. One having ordinary skill in the art would recognize that variations can be made to the flow diagrams without departing from the broader spirit and scope of the disclosure as set forth in the following claims.

The invention claimed is:

1. A method implemented by a network device in a communication network, the network device operable to communicate with a User Equipment (UE) and a Narrow Band Internet Of Things (NB-IoT) terminal device in the communication network, the method comprising:
   configuring NB-IoT Physical Resource Blocks (PRBs); and
   when scheduling said UE, attempting to allocate said configured NB-IoT PRBs for said UE in response to determining that the configured NB-IoT PRBs remain unallocated to said NB-IoT terminal device and available PRBs other than said configured NB-IoT PRBs being insufficient for said UE,
   wherein attempting to allocate said configured NB-IoT PRBs for said UE comprises:
   scheduling said UE including said configured NB-IoT PRBs; and
   rescheduling said UE by removing said configured NB-IoT PRBs from the allocated PRBs based on at least one of:
      a modulation and coding scheme (MCS) scheduled by said network device for said UE being greater than a first threshold, or
      a number of PRBs allocated for said UE being smaller than a second threshold; or keeping using said configured NB-IoT PRBs for said UE in response to said MCS scheduled by said network device for said UE being smaller than said first threshold and said number of PRBs allocated for said UE being greater than said second threshold.

2. The method of claim 1, wherein said attempting to allocate said configured NB-IoT PRBs for said UE comprising:
scheduling said UE including said configured NB-IoT PRBs; and
carrying Narrow Band Reference Signals (NRSs) in said configured NB-IoT PRBs in response to a MCS scheduled by said network device for said UE being smaller than a third threshold and a number of PRBs allocated for said UE being greater than a fourth threshold; or
muting said NRSs in said configured NB-IoT PRBs in response to at least one of:
said MCS scheduled by said network device for said UE being greater than said third threshold or said number of PRBs allocated for said UE being smaller than said fourth threshold.

3. The method of claim 1, wherein said keeping using said configured NB-IoT PRBs for said UE comprising:
carrying Narrow Band Reference Signals (NRSs) in said configured NB-IoT PRBs in response to said MCS scheduled by said network device for said UE being smaller than a third threshold and a number of PRBs allocated for said UE being greater than a fourth threshold; or
muting said NRSs in said configured NB-IoT PRBs in response to at least one of:
said MCS scheduled by said network device for said UE being greater than said third threshold or said number of PRBs allocated for said UE being smaller than said fourth threshold.

4. The method of claim 3, wherein said first threshold is greater than said third threshold and said second threshold is greater than said fourth threshold.

5. The method of claim 2, wherein after the muting said NRSs in said configured NB-IoT PRBs, said method also comprising:
starting a timer to count a first duration;
carrying said NRSs in said configured NB-IoT PRBs for a second duration upon expiry of said timer; and
resetting said timer.

6. The method of claim 1, wherein said NB-IoT terminal device is deployed in in-band mode.

7. The method claim 1, wherein said UE follows one of communication standards: LTE-Advanced LTE-A, LTE, Wideband Code Division Multiple Access (WCDMA) and High-Speed Packet Access (HSPA).

8. A network device in a communication network, the network device operable to communicate with a User Equipment (UE) and a Narrow Band Internet Of Things (NB-IoT) terminal device in the communication network, said network device comprising:
a processor; and
a memory communicatively coupled to the processor and adapted to store instructions which, when executed by the processor, cause the network device to:
configure NB-IOT Physical Resource Blocks (PRBs);
when scheduling said UE, attempt to allocate said configured NB-IoT PRBs for said UE in response to the configured NB-IoT PRBs remaining unallocated to said NB-IoT terminal device and available PRBs other than said configured NB-IoT PRBs being insufficient for said UE,
wherein the instructions, when executed by the processor, cause the network device to attempt to allocate said configured NB-IoT PRBs for said UE by:
scheduling said UE including said configured NB-IoT PRBs; and
rescheduling said UE by removing said configured NB-IoT PRBs from the allocated PRBs based on at least one of:
a modulation and coding scheme (MCS) scheduled by said network device for said UE being greater than a first threshold, or
a number of PRBs allocated for said UE being smaller than a second threshold; or
keeping using said configured NB-IoT PRBs for said UE in response to said MCS scheduled by said network device for said UE being smaller than said first threshold and said number of PRBs allocated for said UE being greater than said second threshold.

9. The network device of claim 8, wherein the instructions, when executed by the processor, cause the network device to attempt to allocate said configured NB-IoT PRBs for said UE by:
scheduling said UE including said configured NB-IoT PRBs; and
carrying Narrow Band Reference Signals (NRSs) in said configured NB-IoT PRBs in response to a MCS scheduled by said network device for said UE being smaller than a third threshold and a number of PRBs allocated for said UE being greater than a fourth threshold; or
muting said NRSs in said configured NB-IoT PRBs in response to at least one of:
said MCS scheduled by said network device for said UE being greater than said third threshold or said number of PRBs allocated for said UE being smaller than said fourth threshold.

10. The network device of claim 8, wherein the instructions, when executed by the processor, cause the network device to keep using said configured NB-IoT PRBs for said UE by:
carrying Narrow Band Reference Signals (NRSs) in said configured NB-IoT PRBs in response to said MCS scheduled by said network device for said UE being smaller than a third threshold and a number of PRBs allocated for said UE being greater than a fourth threshold; or
muting said NRSs in said configured NB-IoT PRBs in response to at least one of:
said MCS scheduled by said network device for said UE being greater than said third threshold or said number of PRBs allocated for said UE being smaller than said fourth threshold.

11. The network device of claim 10, wherein said first threshold is greater than said third threshold and said second threshold is greater than said fourth threshold.

12. The network device of claim 9, wherein after the muting said NRSs in said configured NB-IoT PRBs, the instructions, when executed by the processor, cause the network device to:
start a timer to count a first duration;
carry said NRSs in said configured NB-IoT PRBs for a second duration upon expiry of said timer; and
reset said timer.

13. The network device of claim 8, wherein said NB-IoT terminal device is deployed in in-band mode.

14. The network device of claim 8, wherein said UE follows one of communication standards: LTE-A, LTE, WCDMA and HSPA.

15. A communication network, comprising:
a UE;
a NB-IoT terminal device; and
a network device operable to communicate with said UE and said NB-IoT terminal device;
wherein said network device comprises a processor and a memory communicatively coupled to the processor and adapted to store instructions which, when executed by the processor, cause the network device to perform operations of implemented by a network device in a communication network, the network device operable to communicate with a User Equipment (UE) and a Narrow Band Internet Of Things (NB-IoT) terminal device in the communication network, the method comprising:
configuring NB-IoT Physical Resource Blocks (PRBs); and
when scheduling said UE, attempting to allocate said configured NB-IoT PRBs for said UE in response to the configured NB-IoT PRBs remaining unallocated to said NB-IoT terminal device and available PRBs other than said configured NB-IoT PRBs being insufficient for said UE,
wherein said attempting to allocate said configured NB-IoT PRBs for said UE comprises:
scheduling said UE including said configured NB-IoT PRBs; and
rescheduling said UE by removing said configured NB-IoT PRBs from the allocated PRBs based on at least one of:
 a modulation and coding scheme (MCS) scheduled by said network device for said UE being greater than a first threshold, or
 a number of PRBs allocated for said UE being smaller than a second threshold; or
keeping using said configured NB-IoT PRBs for said UE based on said MCS scheduled by said network device for said UE being smaller than said first threshold and said number of PRBs allocated for said UE being greater than said second threshold.

16. A non-transitory machine-readable medium having a computer program stored thereon, which when executed by a set of one or more processors of a network device, causes the one or more processors to perform operations of the method implemented by a network device in a communication network, the network device operable to communicate with a User Equipment (UE) and a Narrow Band Internet Of Things (NB-IoT) terminal device in the communication network, the method comprising:
configuring NB-IoT Physical Resource Blocks (PRBs); and
when scheduling said UE, attempting to allocate said configured NB-IoT PRBs for said UE in response to the configured NB-IoT PRBs remaining unallocated to said NB-IoT terminal device and available PRBs other than said configured NB-IoT PRBs being insufficient for said UE,
wherein attempting to allocate said configured NB-IoT PRBs for said UE comprises:
scheduling said UE including said configured NB-IoT PRBs; and
rescheduling said UE by removing said configured NB-IoT PRBs from the allocated PRBs based on at least one of:
 a modulation and coding scheme (MCS) scheduled by said network device for said UE being greater than a first threshold, or
 a number of PRBs allocated for said UE being smaller than a second threshold; or
keeping using said configured NB-IoT PRBs for said UE based on said MCS scheduled by said network device for said UE being smaller than said first threshold and said number of PRBs allocated for said UE being greater than said second threshold.

\* \* \* \* \*